3,455,981
1,4-BIS-(ISOCYANATO- AND ISOTHIOCYA-
NATOMETHYL) - 1 - PHENYLTETRAHY-
DRONAPHTHALENE
Edmund G. Nash, Baltimore, Md., and Marwan R. Kamal
and David Aelony, Minneapolis, Minn., assignors to
General Mills, Inc., a corporation of Delaware
No Drawing. Filed Nov. 30, 1966, Ser. No. 597,871
Int. Cl. C07c *119/04, 161/04*
U.S. Cl. 260—453         3 Claims The present invention relates to a new diisocyanate and diisothiocyanate. It also relates to polymers prepared from the new diisocyanate or diisothiocyanate and compounds having at least two active hydrogen atoms.

We have now discovered new compounds having the idealized structural formula

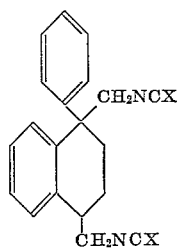

where X is O or S with the proviso that both X's must be the same.

The new diisocyanate of our invention is prepared by the reaction of 1,4-bis-aminomethyl-1-phenyltetrahydronaphthalene or the hydrochloride salt thereof with an excess of phosgene in an inert solvent. The new diisocyanate is prepared in the same manner as the diisocyanate except that thiophosgene is used instead of phosgene.

The starting 1,4-bis-aminomethyl-1-phenyltetrahydronaphthalene is prepared by the hydrogenation of 1,4-dicyano-1-phenyltetrahydronaphthalene. The latter compound is prepared by polymerizing α-cyanostyrene and then fractionating the polymerization product and recovering the dimer fraction which is 1,4-dicyano-1-phenyltetrahydronaphthalene. The α-cyanostyrene can be prepared by condensing benzyl cyanide and formaldehyde in the presence of a strong alkaline catalyst and then pyrolyzing the resulting product. Another method of preparing said compound is by the pyrolysis of acetophenone cyanhydrin acetate. The α-cyanostyrene is relatively unstable and thus polymerizes in a short time merely on standing under ambient conditions.

The following examples illustrate the preparation of the new compounds of our invention.

EXAMPLE A

A one liter autoclave was charged with 250 g. of 1,4-dicyano-1-phenyltetrahydronaphthalene, 250 ml. methanol and 40 g. of Raney cobalt catalyst. The autoclave was sealed, pressurized with nitrogen to 500 p.s.i. and vented. This purging was repeated an additional two times to insure the removal of air. The autoclave was then charged with 60 g. ammonia, pressurized with hydrogen to 3000 p.s.i. and the temperature raised to 130° C. The pressure was maintained at 3000 p.s.i. with hydrogen and the temperature controlled at 130° C. for two hours. The autoclave was then cooled to 30° C. and vented. There was obtained 262 g. of product which was distilled through a Claisen head distillation apparatus to remove catalyst complexes. The diamine product had the formula

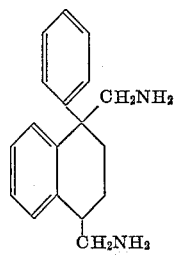

Into a 5 l., 3-necked flask equipped with a condenser, stirrer and gas inlet tube were charged 151.3 g. of the dihydrochloride salt of the 1,4 - bis - (aminomethyl)-1-phenyltetrahydronaphthalene and 3 l. of azeotroped xylene. The salt was prepared by bubbling dry HCl through a solution of 195.2 g. of the diamine in 1.5 l. anhydrous ethyl ether. The salt-xylene solution was heated to reflux. Phosgene was bubbled in at a reaction temperature of 124–134° C. with a total of 311 g. thereof being added over a period of six hours and ten minutes. The resulting clear solution was refluxed for an additional 0.5 hour while dry nitrogen was bubbled through the solution. There was obtained 147.5 g. crude product after concentrating the solution in vacuum. The crude product was purified by distillation on a wiped film still to yield 75 g. of diisocyanate having the structural formula:

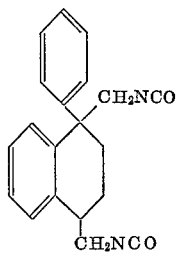

EXAMPLE B

Example A is repeated using thiophosgene in place of phosgene. For resulting 1,4-bis-(isothiocyanatomethyl)-1-phenyltetrahydronaphthalene has the structural formula:

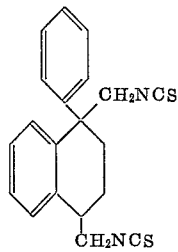

As indicated above, the present invention also includes the polymeric derivatives of the new diisocyanate or diisothiocyanate. Such polymers are prepared by reaction of the diisocyanate or diisothiocyanate with compounds bearing at least two active hydrogen atoms as determined by the Zerewitinoff method. The Zerewitinoff test is described by Kohler in J. Am. Chem. Soc., 49, 3181 (1927).

Such polymers are useful as coatings for a variety of substrates and for other purposes including the preparation of moldings.

In general, the active hydrogen atoms of compounds reactive with our new diisocyanate or diisothiocyanate are attached to carbon, oxygen, nitrogen or sulfur atoms. Compounds containing the following groups will have active hydrogen atoms: acetamido, primary amino, secondary amino, amido, carbamyl, carboxyl, diazoamino, hydrazino, hydrazo, hydrazono, hydroxamino hydroxyl imido, imino, isonitro, isonitroso, mercapto, nitroamino xamyl, sulfamino, sulfamyl, sulfin, sulfo, thiocarbamyl, triazino ureido, ureylene, and urethaneo. Most often these active hydrogen atoms are attached to oxygen, nitrogen, or sulfur atoms; thus they will be a part of groups such as —OH, —SH, —NH—, —NH$_2$, —CO$_2$H, —CONH$_2$, —CONHR where R represents an organic radical, —SO$_2$OH, —SO$_2$NH$_2$, —CSNH$_2$. Examples of suitable types of compounds include water, hydrogen sulfide, ammonia, hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the present invention such as, for example, amino alcohols which contain an amino group and a hydroxyl group, amino alcohols which contain two amino groups and one hydroxyl group, aminoacids and the like. Further illustrative classes and specific organic compounds containing active hydrogen atoms useful for preparing polymers according to our invention are described immediately hereinbelow.

Any suitable polyester may be used and may contain terminal hydroxyl groups, terminal carboxylic acid groups, amino groups and the like. Moreover, the polyester may be a polyester amide which was prepared by condensing an amino alcohol containing both free amino groups and free hydroxyl groups with the other components used in the preparation of polyesters. The polyester may be prepared by reacting a polycarboxylic acid or hydroxy carboxylic acid with polyhydric alcohols. It is also possible to use a mixture of polyhydric alcohols and polyamines such as ethylenediamine, polyethylenediamine, 1,4-butylenediamine and the like. Amines such as diethyl ether diamine or amino carboxylic acids such as glycine, alanine, valine, phenylalanine. hydroxyproline and the like may be used. The polyesters may contain hetero atoms in addition to the ester groups including oxygen, sulfur, nitrogen and the like in the chain. Moreover, the radicals making up the polyester may be either saturated or unsaturated and may contain double or triple bonds as well as modifying radicals of saturated or unsaturated fatty acids such as oleic acid or fatty alcohols such as oleyl alcohol and the like.

Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethyl-succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerine, trimethylolpropane, 1,3,6 - hexanetriol, triethanolamine, pentaerythritol, sorbital and the like.

Any suitable polyhydric polyalkylene ether may be used as the active hydrogen containing compound such as, for example,, the condensation product of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, buylene oxide, amylene oxide, and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, propylene ether glycols, polybutylene ether glycols and the like. It is often advantageous to employ some trihydric or higher polyhydric alcohols such as glycerine, trimethylol propane, pentaerythritol and the like in the preparation of the polyhydric polyalkylene ether so that some branching exists in the product. Generally speaking, it is advantageous to condense from about 5 to about 30 moles of alkylene oxide per functional group of the trihydric or higher polyhydric alcohol. The polyhydric polyalkylene ethers may be prepared by any known process such as, for example, the process disclosed in 1859 by Wurtz in Encyclopedia of Chemical Technology, volume 7, pages 257 to 262, published by Interscience Publishers, Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,360.

Any suitable polyhydric alcohol may be used as the active hydrogen containing compound such as, for example, alkane diols such as, for example, ethylene glycol, 1,3-propylene glycol 1,2-propylene glycol, 1,4-butylene glycol, 1,3-butylene glycol, 1,5-pentanediol, 1,4-butanediol, 1,3-pentanediol, 1,6-hexanediol, 1,7-heptanediol, 2,2-dimethyl-1,3-propanediol, 1,8-octanediol and the like including 1,20-eicosanediol and the like; alkene diols such as, for example, 2-butene-1,4-diol, 2-pentane-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like, alkene triols such as 4-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example 1,2-ethane dithiol, 1,2-propane dithiol, 1,3-propane dithiol, 1,6-hexane dithiol, 1,3,6-hexane trithiol and the like; alkene thiols such as for example, 2-butene-1,4-dithiol and the like; alkyne thiols such as, for example, 3-hexyne-1,6-dithiol and the like.

Any suitable polyamine may be used including, for example, aromatic polyamines such as, for example, p-amino aniline, 1,5-diamino naphthalene, 2,4-diaminotoluene, 1,3,5-benzene triamine, 1,2,3-benzene triamine, 1,4,5,8-naphthalene tetramine and the like; aliphatic polyamines such as, for example, ethylenediamine, 1,3,-propylenediamine, 1,4-butylenediamine, 1,3-butylenediamine, dithylenetriamine, triethylenetetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazole, piperazine and the like.

One especially preferred group of amines useful for preparing polymers according to our invention are polyamines having the primary amine groups thereof blocked by ketimine or aldimine groups. The reaction of carbonyl compounds with the primary amine groups can be illustrated as follows:

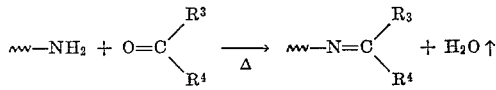

The useful carbonyl compounds may have the following theoretical structural formula:

where $R^3$ and $R^4$ are organic radicals, are each substantially inert to the ketimine or aldimine formation reaction and are preferably hydrogen or short chain alkyl groups (1 to 4 carbon atoms). Preferred compounds are low molecular weight ($C_2$–$C_6$) aldehydes or ketones that are volatile so that an unreacted excess thereof may easily be removed by conventional distillation practices when the reaction is completed. Such volatile compounds are also preferred so that when the blocked polyamine is mixed with the new diisocyanate and exposed to moisture, the freed aldehyde or ketone can be easily removed from the reaction mixture. Examples of preferred carbonyl compounds include such aldehydes and ketones as acetone, methylethyl ketone, methyl-n-butyl ketone, methyl-tert-butyl ketone, ethylisopropyl ketone, acetaldehyde, propionaldehyde, butyraldehyde, isobutyraldehyde, and the like (i.e. including hexanone and hexanal). The polyamines to be blocked preferably have structure

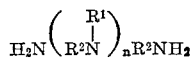

or $$H_2N(R^2NH)_nR^2NH_2$$

where $R^2$ is a difunctional aliphatic group containing from 2–48 carbon atoms, $R^1$ is an aliphatic group containing 1–24 carbon atoms and $n$ is an integer of from 0–20. Representative $R^1$ radicals are methyl, propyl, butyl, decyl, hexadecyl, hexenyl, octenyl, tridecenyl, octadecyl, undecynyl and the like. Inert or non-interfering groups such as Cl, nitro and the like may be present on $R^1$ and/or $R^2$.

Any suitable reaction product of a phenol with an alkylene oxide yielding a compound containing active hydrogens may be used such as, for example, those disclosed in U.S. Patent 2,843,568, such as for example, the reaction product of hydroquinone with ethylene oxide to give a polyalkylene arylene ether glycol having a molecular weight above about 750 or other polyalkylene arylene ether glycols disclosed in said patent.

Any suitable reaction product of a phenol-aldehyde resin with an alkylene oxide may be used such as, for example, a novolak having the formula

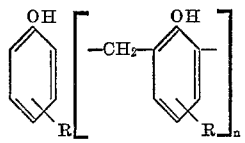

wherein $n$ is 1 to 5 and R is a lower alkyl radical such as methyl ethyl, propyl, butyl, tertiary butyl and the like reacted with an alkylene oxide such as those disclosed above for the preparation of the polyhydric polyalkylene ethers.

Any suitable reaction product of an amine with an alkylene oxide may be used such as, for example, the reaction product of an alkylene oxide with a tolylenediamine such as, 2,4-tolylenediamine, 2,6-tolylenediamine or the like, a diphenylmethane diamine such as 4,4-diaminodiphenylmethane or the like, xylylene diamine, as well as alkylene diamines such as for example, ethylenediamine, propylenediamine, 1,4-butylenediamine, hexamethylenediamine and the like including 1,10-dodecane diamine.

Any suitable phenol may be used such as, for example, 2,2-bis(p-hydroxyphenyl)propane (Bisphenol A) and the like.

Any suitable polyamide may be used such as, for example, those obtained by reacting adipic acid with hexamethylenediamine and the like.

Any suitable polyacetal may be used such as, for example, the reaction product of formaldehyde or other suitable aldehydes with a polyhydric alcohol such as those disclosed above for use in the preparation of the hydroxyl polyester.

Other alcohol compounds which do not necessarily fit within any of the previously set forth classes of compounds and which nevertheless contain active hydrogen containing groups which are quite suitable for the production of the polymers of the present invention are pentaerythritol, sorbitol, triethanolamine, mannitol, N, N,N',N' - tetrakis(2-hydroxypropyl)ethylenediamine, as well as compounds of any of the classes set forth above which are substituted with halogen such as, for example, chloro, iodo, bromo and the like; nitro; alkoxy, such as, for example, methoxy, ethoxy, propoxy, butoxy and the like; carboalkoxy such as for example, carbomethoxy, carbethoxy and the like; dialkyl amino such as, for example, dimethylamino, diethylamino, dipropylamino, methylethylamino and the like; mercapto, carbonyl, thiocarbonyl, phosphoryl, phosphato and the like.

Other substances which can be used include natural substances such as castor oil and the like.

The molar proportions of the diisocyanate or diisothiocyanate of our invention and the compounds bearing Zerewitinoff active hydrogen atoms can vary widely. Those skilled in the art can determine the proportions of reactants best suited for a particular purpose. For example, when making polyurethane elastomers, one often uses approximately equimolar amounts of glycol and the new diisocyanate or diisothiocyanate. Preferably the active hydrogen containing compound will be used in a molar ratio to the new diisocyanate or diisothiocyanate of 1:10 to 10:1.

The polymers of our invention can be prepared by reacting the new diisocyanate or diisothiocyanate and the active hydrogen containing compound at subatmospheric, atmospheric or superatmospheric pressure. Atmospheric pressure is preferred. The reaction can be operated over a wide range of temperatures. Those skilled in the art will recognize that there are great differences in the relative reactivity of various groups containing active hydrogen atoms, amines reacting faster than alcohols, primary alcohols reacting faster than tertiary alcohols—to name a few examples; accordingly, one will select a temperature at which the reaction occurs at a rate convenient for the purpose at hand. Preferably, the reaction temperature ranges between about 20° C. and 150° C. However, the temperature is not critical.

If desired, the reaction may be carried out in an inert solvent. Representative solvents include tetrahydrofuran, o-dichlorobenzene, chlorobenzene, xylene, methyl isobutyl ketone, toluene and ethyl acetate. In general, the solvent should be free from isocyanate-reactable groups such as groups bearing Zerewitinoff-active hydrogen atoms.

Any catalyst which is capable of catalyzing the reaction between an active hydrogen containing compound and an isocyanate can be used in the preparation of the polymers of our invention. This includes all of the heretofore known catalysts for urethane reactions which are preferably basic organic accelerators such as, tertiary amines or non-basic metallic compounds such as those disclosed in U.S. Patent 2,846,408 and the compounds for the catalysis of the isocyanate-hydroxyl reaction disclosed in the "Journal of Applied Polymer Science," volume IV, issue No. 11, pages 207 to 211 (1960). It is not possible to mention here each and every catalyst which is contemplated by the invention because to do so would take up too much space. It is only possible to mention some of the more important examples. The tertiary amines may be used such as hexahydrodimethyl aniline, triethyl amine, N-ethylmorpholine, N-methyl-N'-dimethyl-aminoethyl piperazine, triethylenediamine, permethylated diethylenetriamine, bis(aminoethyl)adipate, N-methyl morpholine, dimethyl cetyl amine, N,N,N',N'-tetramethyl 1,3-butylenediamine, diethylethanolamine, N-coco-morpholine, 3-ethyl-N-dimethylpropylamine, N-dimethyl-N-methyl-isopropyl propylenediamine, N-dimethyl aminopropyl acetamide, N,N-diethyl-3-(dimethylamino)propyl amine, dimethylbenzylamine, hydramethyl morpholine, dimethyl propylamine, N,N-diethyl hydroxyethylammonium benzoate, N,N-diethylaminoethylbenzene and the like.

Any suitable metal catalyst may be used such as, for example, bismuth nitrate,
lead 2-ethylhexoate,
lead benzoate,
lead oleate,
butyl tin trichloride,
stannic chloride,
tributyltin cyanate,
stannous octoate,
stannous oleate,
dibutyltin di(2-ethylhexoate),
dibenzyltin di(2-ethylhexoate),
dibutyltin dilaurate,
dibutyltin diisooctylmaleate,
dibutyltin sulfide,
dibutyltin dibutoxide,
dibutyltin bis-(o-phenylphenate),
dibutyltin bis(acetylacetonate),
di(2-ethylhexyl)tin oxide,
titanium tetrachloride,
dibutyltitanium dichloride,
tetrabutyl titanate,
butoxytitanium trichloride,
ferric chloride,
ferric 2-ethyl-hexoate,
ferric acetylacetonate,
antimony trichloride,
antimony pentachloride,
triphenylantimony dichloride,
uranyl nitrate,
cadmium nitrate,
cadmium diethyldithiophosphate,
cobalt benzoate,
cobalt 2-ethyl hexoate,
thorium nitrate,
triphenylaluminum,
trioctylaluminum,
aluminum oleate,
diphenylmercury,
zinc 2-hexoate,
zinc naphthenate,
nickel naphthenate,
molybdenum hexacarbonyl,
cerium nitrate,
vanadium trichloride,
cupric 2-ethyl hexoate,
cupric acetate,
manganese 2-ethyl hexoate,
manganese linoresinate,
zirconium 2-ethyl hexoate and
zirconium naphthenate and the like.

The preferred catalysts are the tertiary amines and the organotin compounds, especially triethylenediamine, stannous octoate, stannous oleate, dibutyltin dilaurate, dibutyltin di(2-ethyl hexoate) and the like.

In the preparation of polymers according to our invention, a portion of the new diisocyanate or diisothiocyanate (i.e. up to about 90 mole percent and preferably from 0 to 50 mole percent) can be replaced by known polyisocyanates or polyisothiocyanates. Representative of such known polyisocyanates and polyisothiocyanates are ethylenediisocyanate,
hexamethylenediisocyanate,
butylene-1,3-diisocyanate,
ethylidene diisocyanate,
butylidene diisocyanate,
1,2,4-butanetriisocyanate,
1,3,3-pentanetriisocyanate,
p-phenylene-2,2'-bis(ethylisocyanate),
1,4-naphthalene-2,2'-bis(ethylisocyanate),
5-chloro phenylene-1,3-bis(propyl-3-isocyanate),
tolylene diisocyanate,
m-phenylene diisocyanate,
p-phenylene diisocyanate,
diphenylene-4,4'-diisocyanate,
xylylene-1,4-diisocyanate,
4,4'-diphenylenemethanediisocyanate,
the corresponding polyisothiocyanates and the like.

A particularly desirable group of polyisocyanates to be employed in combination with our new diisocyanates in the preparation of the polymers of the invention are those described in the application of Rogier and Kamal, Ser. No. 250,211, filed Jan. 9, 1963, entitled "Polyisocyanates and Derivatives." These polyisocyanates are derived from polymeric fat acids and have the following idealized structural formula:

where $y$ is 0 or 1, $x$ is an integer of 2 to about 4 and $R^5$ is the hydrocarbon group of polymeric fat acids. Preferably, $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. The said polyisocyanates are further described in the noted Rogier and Kamal application which disclosure is incorporated herein by reference.

The following examples illustrate the preparation of polymers of the present invention. The said examples are not to be considered as limiting.

EXAMPLE I

A mixture of 7.9 g. (0.05 eq.) 1,4-bis-(isocyanatomethyl)-1-phenyltetrahydronaphthalene as prepared in Example B, 7.5 g. xylene, 7.5 g. Cellosolve acetate and 14.2 g. (0.05 eq.) of a ketimine blocked polyamine was applied as a 1.5 mil coating on glass, tin plate, steel and aluminum panels. The ketime blocked polyamine was prepared by reacting one mole diethylenetriamine with two moles methyl isobutyl ketone, the secondary amine group of the polyamine being blocked by reacting two moles of the above product with one mole of dimeryl isocyanate. The dimeryl isocyanate had the theoretical structural formula $D(CH_2NCO)_2$ where D is the dimeric fat acid radical derived from the mixture of dimerized fat acids obtained from the fat acids in tall oil consisting mainly of a mixture of dimerized linoleic and oleic acids. The ketimine blocked polyamine thus had the idealized structural formula

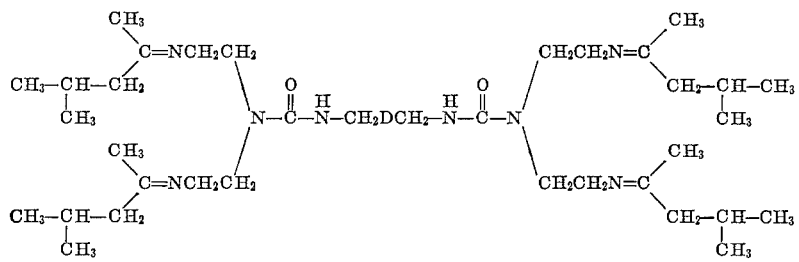

The coated substrates were exposed to an atmosphere containing 50% relative humidity and having a temperature of 72° F. The coatings became tack free in 25 minutes. They were allowed to cure under the above conditions for 14 days. The coating on glass had a Pencil hardness of B and Sward Rocker hardness of 42. The coating on tinplate had an extensibility of greater than 60% (G.E. Tester). The coatings had very good adhesion to glass, tin plate and aluminum and fair adhesion to steel. The cured coatings also had a very good solvent resistance remaining hard when immersed for about 18 hours in water, aviation gas, Skydrol 500, mineral spirits, 20% NaOH and oleic acid. They remained medium hard in toluene and ethanol and were softened by 5% acetic acid and 37% $H_2SO_4$. The acid tests were carried out on the coated glass and the remaining solvent resistance tests were carried out on coated tin plate.

EXAMPLE II

Nine grams (0.038 eq.) of a polyether polyol made by the condensation of 1,2,6-hexane triol and propylene oxide (LHT–240 available from Union Carbide), 6.05 g. (0.038 eq.) 1,4-bis-(isocyanatomethyl)-1-phenyltetrahydronaphthalene and 0.07 g. stannous octoate (catalyst) were mixed in a small container and degassed by applying vacuum to remove any trapped air bubbles. The viscous mixture was then cast in small petri dishes. After 12 days curing at 72° F. and 50% relative humidity a hard, extensible, elastomeric product was obtained. The cured polymer had a Shore "A" hardness of 93, a maximum elongation of 196% and a tensile strength of 937 p.s.i. (at break).

What is claimed is:
1. A compound of the formula:

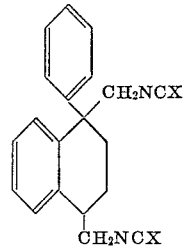

where X is O or S with the proviso that both X's must be the same.
2. The compound of claim 1 where X is O.
3. The compound of claim 1 where X is S.

References Cited
UNITED STATES PATENTS

| | | | |
|---|---|---|---|
| 2,530,408 | 11/1950 | Stahly | 260—454 |
| 2,855,420 | 10/1958 | Petropoulos | 260—453 |
| 3,160,648 | 12/1964 | O'Brochta et al. | 260—453 |

CHARLES B. PARKER, Primary Examiner

D. H. TORRENCE, Assistant Examiner

U.S. Cl. X.R.

260—18, 75, 47, 566, 77.5, 465, 570.9, 533, 454